United States Patent
Van Vossen et al.

(10) Patent No.: US 12,339,413 B2
(45) Date of Patent: Jun. 24, 2025

(54) METHOD AND SYSTEM FOR DETERMINING TOP AND BOTTOM DEPTH OF AN UNDER WATER MUD LAYER

(71) Applicant: Nederlandse Organisatie voor toegepast-natuurwetenschappelijk onderzoek TNO, 's-Gravenhage (NL)

(72) Inventors: Robbert Van Vossen, Woerden (NL); Augustinus Laurens Dominicus Beckers, 's-Gravnehage (NL); Johannes Jeroen Maria Van De Sande, 's-Gravenhage (NL); Maurits Reinold Huisman, Rijswijk (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/617,237

(22) PCT Filed: Jun. 11, 2020

(86) PCT No.: PCT/NL2020/050373
§ 371 (c)(1),
(2) Date: Dec. 7, 2021

(87) PCT Pub. No.: WO2020/251356
PCT Pub. Date: Dec. 17, 2020

(65) Prior Publication Data
US 2022/0236437 A1    Jul. 28, 2022

(30) Foreign Application Priority Data
Jun. 11, 2019   (EP) .................................. 19179509

(51) Int. Cl.
*G01V 1/38*   (2006.01)
*G10K 11/20*  (2006.01)

(52) U.S. Cl.
CPC .......... *G01V 1/3808* (2013.01); *G10K 11/205* (2013.01); *G01V 2210/121* (2013.01); *G01V 2210/64* (2013.01)

(58) Field of Classification Search
CPC ............... G10K 11/205; G01V 1/3808; G01V 2210/121; G01V 2210/64; G01S 15/10; G01S 15/88
(Continued)

(56) References Cited

U.S. PATENT DOCUMENTS

| | | | | |
|---|---|---|---|---|
| 4,924,449 A | * | 5/1990 | Guigne | G01V 1/38 367/138 |
| 2004/0027918 A1 | * | 2/2004 | Preston | G01V 1/38 367/88 |
| 2012/0143803 A1 | * | 6/2012 | Wada | G01S 15/88 706/18 |

FOREIGN PATENT DOCUMENTS

| | | |
|---|---|---|
| BE | 1015072 A3 | 9/2004 |
| CN | 106484997 A | 3/2017 |

OTHER PUBLICATIONS

Williams et al. "Acoustic Backscattering from a Sand and a Sand/Mud Environment: Experiments and Data/Model Comparisons", IEEE Journal of Oceanic Engineering, vol. 34, No. 4, Oct. 2009 (2009) (Year: 2009).*

(Continued)

*Primary Examiner* — Luke D Ratcliffe
*Assistant Examiner* — Christopher Richard Walker
(74) *Attorney, Agent, or Firm* — Leydig, Voit & Mayer, Ltd.

(57) ABSTRACT

Depth of a top (24) and bottom (28) of an under water mud layer (26) are measured as a function of position from acoustical scattering measurement. The measurement involves transmitting sound from a transmitter (12) in a body of water (22) above the mud layer (26), using a higher (Continued)

and lower frequency range, above 100 kHz and below 20 kHz respectively. A higher frequency signal due to scattering of the sound in the higher frequency range from scatter positions along a selected horizontal direction is detected as a function of time from said transmitting, and a first depth, of a top surface (24) of the under water mud layer (26), is computed using this signal. A plurality of received lower frequency signals due to scattering of the sound in the lower frequency range is detected at different height in the body of water (22). A time shift as a function of time between temporal parts of the plurality of received lower frequency signals is determined in the plurality of received lower frequency signals, and a second depth of a bottom surface (28) of the under water mud layer is computed based on the time shifts.

12 Claims, 2 Drawing Sheets

(58) Field of Classification Search
USPC .......................................................... 367/131
See application file for complete search history.

(56) References Cited

OTHER PUBLICATIONS

Hunter et al. "Detection of Underwater UXOs in Mud", SEDRP Project MR-2200, Apr. 2013, (2013) (Year: 2013).*

Sæbø et al., "Bathymetric Capabilities of the HISAS Interferometric Synthetic Aperture Sonar," Oceans 2007, Vancouver, BC, Canada, 2007, pp. 1-10, (Year: 2007).*

Łubniewski, Zbigniew, and Andrzej Stepnowski. "Seafloor Characterisation Using Underwater Acoustic Devices." 2018 Joint Conference-Acoustics. IEEE, 2018. (Year: 2018).*

European Patent Office, International Search Report in corresponding International Application No. PCT/NL2020/050373, dated Sep. 9, 2020 (3 pages).

Saebo et al., "Bathymetric Capabilities of the HISAS Interferometric Synthetic Aperture Sonar," Oceans 2007, Sep. 29, 2007 IEEE, Piscataway, NJ, USA, pp. 1-10, XP031229200.

J.A. Hin et al., "Inventory of Measurement Methods for Determining Dredging Volumes," Mar. 14, 2006, XP55647011, retrieved from the internet at: https://www.stowa.nl/sites/default/files/assets/PUBLICATIES/Publicaties%202000-2010/Publicaties%202005-2009/STOWA%202006-07.pdf [retrieved on Nov. 27, 2019] (64 pages).

P.J. Barclay et al., "Using a Multi-Frequency Synthetic Aperture Sonar for Bathymetry," Dept. of Electrical and Electronic Engineering, University of Canterbury, Private Bag 4800, Christchurch, NZ (6 pages).

Daniel D. Sternlicht et al., "Advanced Sonar Technologies for Autonomous Mine Countermeasures," U.S. Government work not protected by U.S. copyright (5 pages).

* cited by examiner

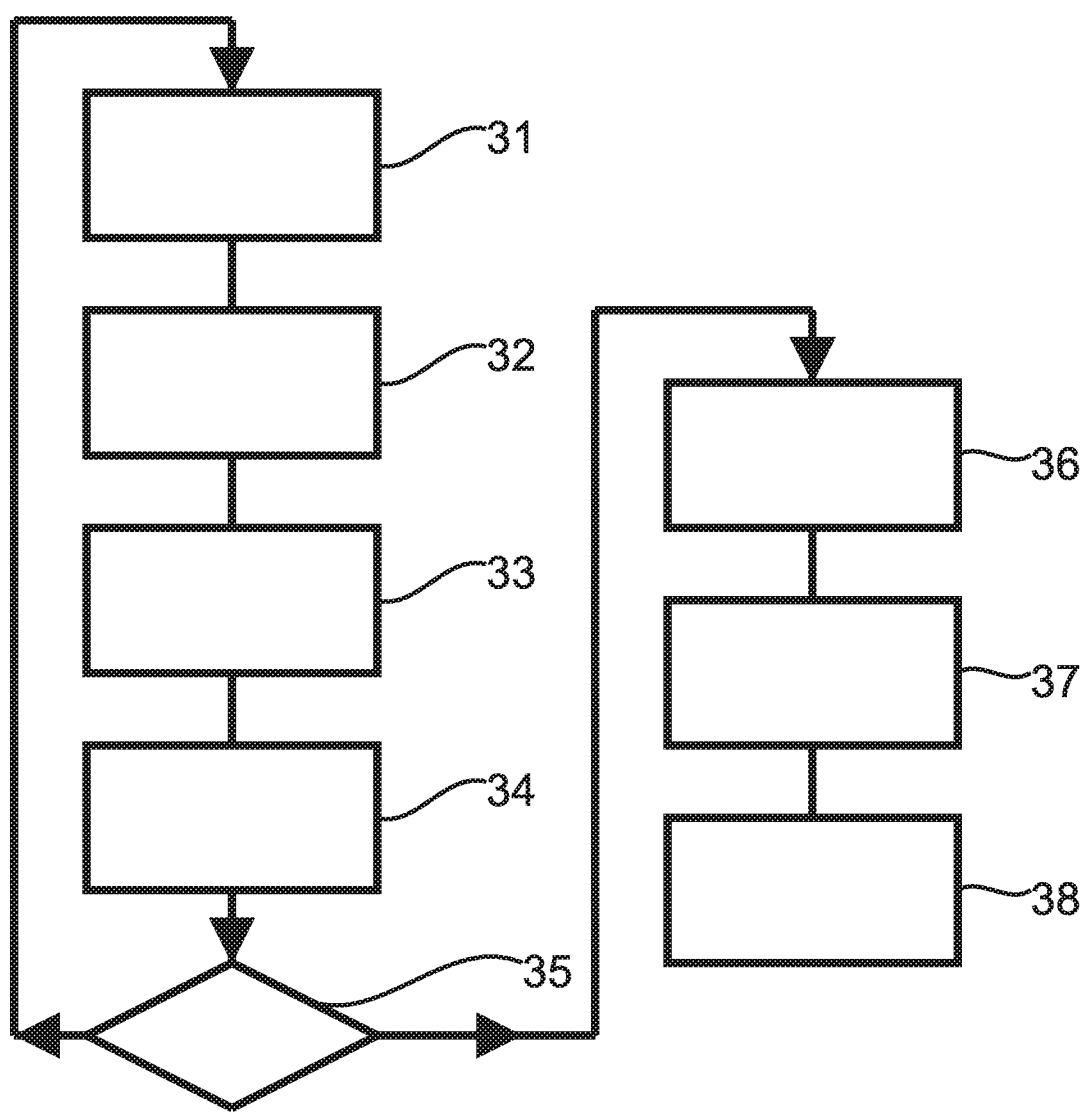

METHOD AND SYSTEM FOR DETERMINING TOP AND BOTTOM DEPTH OF AN UNDER WATER MUD LAYER

CROSS-REFERENCE TO RELATED APPLICATIONS

This patent application is a U.S. National Phase of PCT International Application No. PCT/NL2020/050373, filed Jun. 11, 2020, which claims priority to European Application No. 19179509.5, filed Jun. 11, 2019, which are both expressly incorporated by reference in their entireties, including any references contained therein.

FIELD OF THE INVENTION

The invention relates to a device and method that measure the thickness of an under water mud layer on a sea or water-floor.

BACKGROUND ART

In section 2.2.2 of an overview of methods for measuring dredging volumes, titled "Inventarisatie meetmethoden voor het bepalen van baggervolumes" published in 2006 by STOWA (ISBN 90.5773.326.9), further referred to as the STOWA report, acoustical techniques for measuring a dredging volume are described.

Silt and clay particles in a body of water settle in an under water mud layer, in which their surrounding is saturated with water. The density (weight per unit volume) of such a water saturated layer is little higher than that of pure water (typically less than 1.2 times the density of pure water). The under water mud layer can be distinguished from other layers such as gravel or sand layers by this density, i.e. the size of the fraction of water in the layer, and/or the average grain size in the layer and/or its composition of clay and/or silt in a water matrix. Particles with a larger grain size, like gravel or sand (average grain size larger than 62.5 micrometer) form a layer or layers of higher density below the under water mud layer.

Dredging is used to maintain a desired water depth for navigation or drainage or to remove pollution. Usually, it suffices to remove material from at least part of the under water mud layer to maintain the desired water depth. If a part of an underlying sand or gravel layer also has to be removed, this usually requires a different removal technique. The dredging volume is the volume of material that has to be removed from an extended area of water floor.

Measurements of the depth of the water above the under water mud layer can be used to determine whether dredging is needed. From measurements over a water floor area a determination can be made of the dredging volume that needs to be removed.

In addition to non-acoustic techniques for determining the level of the water floor, the STOWA report describes single beam acoustic echo sounding, multiple beam echo sounding, side scan sonar and sub-bottom profiling. Single beam echo sounding measures distance from a vessel to the water floor from the reflection delay of a vertically directed acoustic beam. Multiple beam echo sounding does the same with a plurality of directed beams in a fan-plane. Side scan sonar that transmits signals over a wide angle and measures reflections while the sonar is towed through the water. Sub-bottom profiling is comparable to single beam echo sounding, but it uses pulses containing lower frequency sound, so that the pulses penetrate into the water floor.

The STOWA report explains that, for estimating dredging volumes, in practice single beam and multi-beam echo sounding are mainly used. Side scan sonar is only sporadically used because its results are less accurate than single beam and multi-beam echo sounding: side scan sonar is more suitable for detecting hard objects such as wreckage on the water floor. Sub-bottom profiling is mainly used for detecting pipes and cables and other object below the water floor, but the STOWA report notes that it can be used to detect the boundary between the under water mud layer and a denser underlying layer. Test measurements showed systematically too low values where a under water mud layer of more than half a meter was present.

Section 2.5.2 of the STOWA report describes signal processing of the acoustic measurements, to form a map of the height of the water floor. From such a map the dredging volume can be computed by comparing it with the depth that has to be reached with the dredging.

It is desirable to be able to determine the height of the under water mud layer between the water-under water mud and sand-under water mud interfaces. This is relevant for dredging, since different dredging techniques may have to be used to dredge under water mud and the underlying sand when the overall water depth has to be realized.

CN106484997 discloses measurement of the thickness of a silt layers, using ultrasound waves at frequencies of 50 Mhz and 180 Mhz Hz to detect reflections from the bottom interface and the top interface of the silt layer respectively. Constrained interpolation is used to interpolate measurements at different locations.

BE1015072 discloses measurement of the thickness of a mud layer using ultrasound that is transmitted obliquely and received at a horizontal array or receivers at a horizontal distance from the transmitter.

SUMMARY

Among others it is an object to provide for a reliable method of mapping the depth of the top and bottom surface of an under water mud layer, and preferably mapping the thickness of the silt layer.

A method according to claim 1 is provided. It has been found that by using scattering at sound frequencies in different frequency ranges, above 100 kHz (more preferably above 150 kHz or 400 kHz) and below 20 kHz (more preferably below 15 kHz or 10 kHz) combined with a computation of the depth from the time shifts between scattering received at different heights in at least the lowest frequency band a reliable map of the depth of the top and bottom surface of the under water, under water mud layer, can be obtained. A map of the thickness of the under water mud layer can be determined from the difference between the depths at the different sound frequencies. In this way, depths can be computed for a wide lateral range of positions.

The map of the bottom surface is determined by detecting a plurality of lower frequency signals received at respective different heights in the body of water, due to scattering of the sound in the lower frequency range from scatter positions along the selected horizontal direction, as a function of time from said transmitting; determining time shifts between the plurality of lower frequency signals received at the respective different height from the same scatter positions on the bottom surface of the under water mud layer; and computing a second depth of a bottom surface of the under water mud layer based on the time shifts.

A plurality of received lower frequency signals may be detected that are due to scattering of the sound in the lower frequency range from scatter positions along the selected horizontal direction, as a function of time from said transmitting, each of the plurality or received lower frequency signals being received at a respective different height in the body of water. The time shift as a function of time between temporal parts of the plurality of received lower frequency signals that have matching time dependences in the plurality of received lower frequency signals may be determined; and a second depth of a bottom surface of the under water mud layer that gave rise to the temporal parts based on the time shifts may be computed. The temporal parts may be time intervals of the signals. In an embodiment, the temporal parts of these signals that have matching time dependences may be selected by selecting time offsets between temporal parts in different ones of the signals at which the correlation between the signals is maximal.

In an embodiment the first depth and the second depth are computed using the received higher frequency signal and the plurality of received lower frequency signals in a time window that includes scattering of sound waves from distances from a positions of transmission at which the direction of propagation of the sound waves is at least thirty degrees and more preferably at least sixty degrees to the vertical direction (i.e. the average normal of the water bottom surface).

As is known per se, the relation between the depth and the time shifts is a matter of simple geometry: the distance D to a receiver from a position that lies h deeper than the receiver and at a horizontal distance x is the square root of the sum of the squares of h and x. The expression for distance D' to a second receiver that lies h'=h+dh higher than the position is similar. The depth h can solved when the distances D and D' are known from the travel times. When the horizontal distance x is the same, the difference between the squares of the distances D and D' equals the difference between the squares of h and h' and does not depend on x. for example, for equal x and given dh, h can be solved from this, even if x is not accurately known. When dh is small, dh approximately equals D*(D'−D)/dh.

In an embodiment the depth determination from scattering in the higher frequency band is also performed using time shifts between scattering received at different heights. But at sufficiently high frequencies, other ways of determining the depth of the scattering interface can be used, such as multi-beam systems, like a multi-beam echo sounder.

The time shifts are determined for scattering along a selected horizontal direction, e.g. along a direction transverse (e.g. perpendicular) to a direction of motion of a platform to which the transmitters are attached. Scattering along the selected horizontal direction may be resolved by known synthetic imaging techniques, using measurements obtained at different positions during movement of the platform, or simultaneously by means of an array of receivers at such positions. For example, to obtain a scattered signal for each position along the selected horizontal direction, signals received at different positions along the direction of movement may be added with relative delays that compensate for the differences in travel time from the different positions along the direction of movement to the position along the selected horizontal direction.

According to another aspect, a water depth measuring system is provided that is configured to perform the method. Preferably, the transmitters and receivers are attached at fixed relative distances to a platform, such as a ship, that can move through the water. Such a platform may be provided with sensors to measure the position and/or orientation of the platform. The processing circuit may be configured to account for the measured position and/or orientation in the computation of the depths.

BRIEF DESCRIPTION OF THE DRAWING

These and other advantageous aspect and advantages will become apparent from a description of exemplary embodiments withe reference to the following figures.

FIG. 3 shows a flow-chart of under water mud layer thickness measurement

DETAILED DESCRIPTION OF EXEMPLARY EMBODIMENTS

Figure 1:
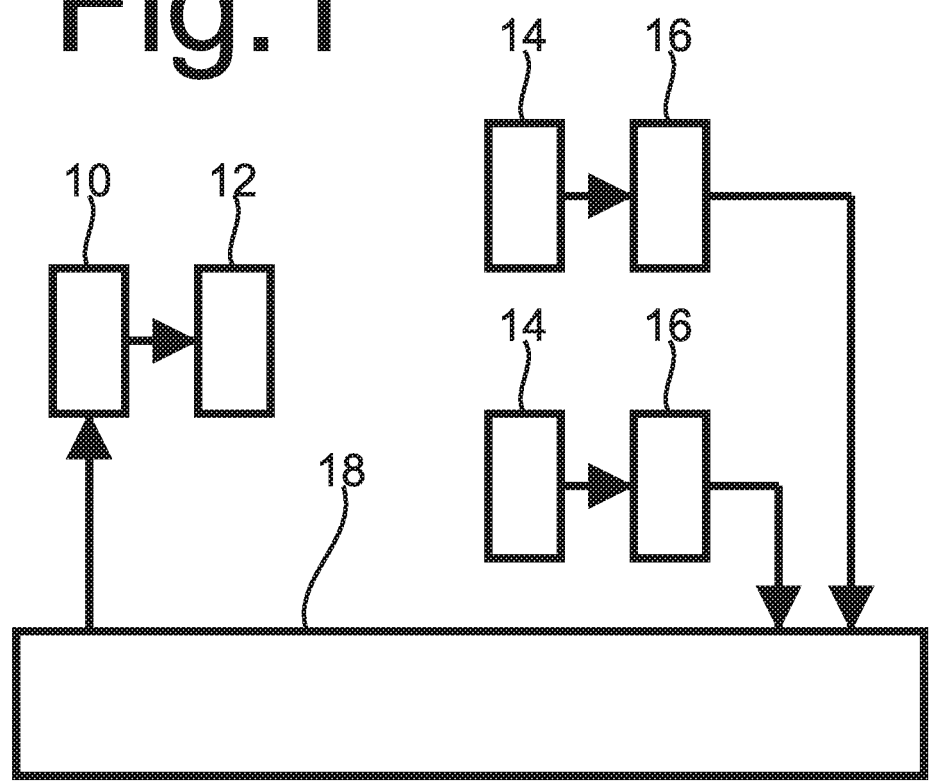
FIG. 1 shows a under water mud layer thickness measuring system

FIG. 1 shows a under water mud layer thickness measuring system. The system comprises a signal generator 10, a sound transmitter 12, an array of sound receivers 14, detectors 16 and a processing circuit 18. Processing circuit 18 as an output coupled to a control input of signal generator 10 and inputs coupled to outputs of detectors 16. Signal generator 10 has an output coupled to sound transmitter 12. Array of sound receivers 14 is coupled to array of detectors 16. Array of sound receivers 14 comprises at least two sound receivers 14 and array of detectors 16 comprises as many detectors.

Figure 2:
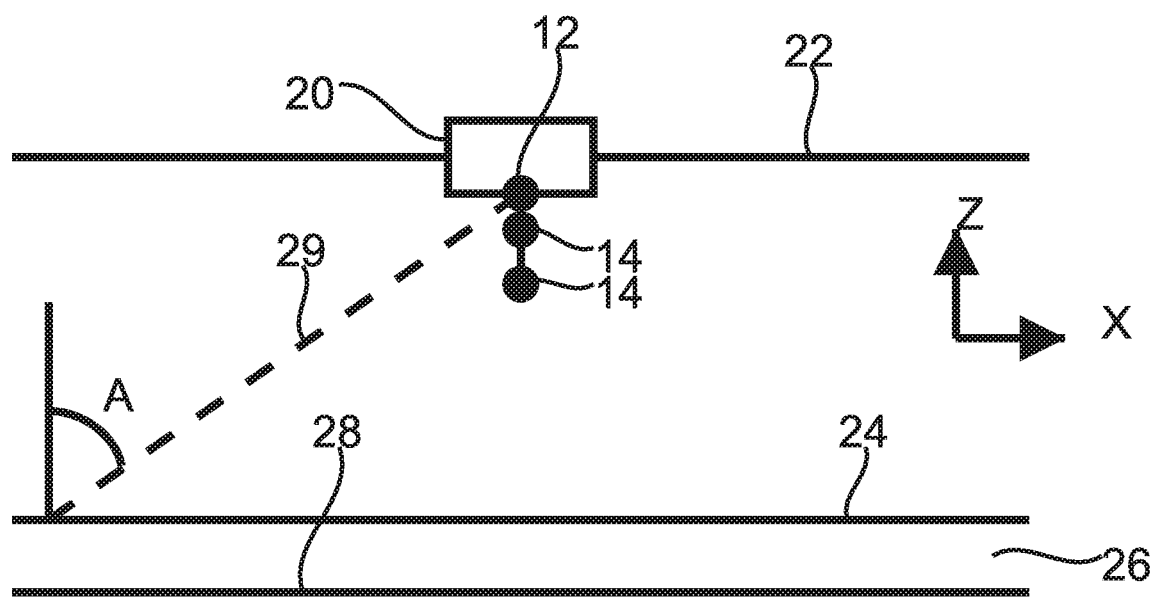
FIG. 2 shows a measurement configuration

FIG. 2 shows a floating platform 20, which may be a ship, wherein sound transmitter 12 and array of sound receivers 14 are attached to floating platform 20 and located underneath the bottom of floating platform 20. As used herein, "floating" means not sinking, including floating on the surface and floating as some depth underneath the water surface. Array of sound receivers 14 is oriented with the sound receivers at different vertical positions, preferably along a vertical line. In the illustrated embodiment, floating platform 20 floats on a body of water 22 above the water floor 24 under body of water 22. A dashed line 29 indicates a ones of the direction of propagation of the sound waves that are incident on under water mud layer 26.

The bottom underneath water floor 24 comprises a under water mud layer 26 on top of a sand layer 28. Although a sand layer is shown by way of example, it should be noted that similar effects occur if another layer is present instead of sand, as long as the layer has a higher density than under water mud. As indicated, the horizontal direction in the figure will be referred to as the x-direction and the vertical direction will be referred to as the z-direction.

Although an example using a single sound transmitter 12 will be described, it should be appreciated that instead an array of sound transmitter 12 may be used. In this way a more focused sound beam can be realized. This has the advantage that interference from sound paths that include reflection and/or scattering from the water surface can be reduced. Similarly, although two sound receivers 14 may suffice, instead array of sound receivers 14 may comprise two sub-arrays of sound receivers 14. This may be used to restrict the directional sensitivity to backscatter from the water floor, so that interference from sound paths that include reflection and/or scattering from the water surface can be avoided.

Processing circuit 18 comprises a computer program to control its operation. As used herein, when processing circuit 18 is said to be configured to perform an action this means that the computer program comprises machine readable instructions that will make processing circuit 18 perform that action and that, alternatively processing circuit 18 comprises a circuit that is hardwired to perform that action.

Processing circuit 18 is configured perform measurements on back scatter of sound having a first and second predetermined frequency or first and second predetermined frequency range in high and low frequency bands respectively, for example at a frequency above 100 kHz (preferably above 150 kHz and more preferably above 400 kHz) and below 20 kHz (more preferably below 10 kHz) respectively. The frequency ranges have been selected according to the backscatter properties of under water mud layers for sound waves. The processing of the measurements on back scatter of sound is applied to backscatter received in a time window from transmission that includes scattering of sound waves from distances at which the direction of propagation of the sound waves has an angle A of incidence (at least sixty degrees and more preferably seventy five degrees to the normal of the water bottom surface).

In an embodiment, sound transmitter 12 may be a sound transducer that is used as one of sound receivers 14. Although a embodiment has been shown wherein it is assumed or the sake of simplicity that sound transmitter 12 sound receivers 14 are used to transmit and receive in both the higher and lower frequency range, preferably different sound transmitters and/or sound receivers are used for these different frequency ranges. In such an embodiment, a plurality of transmitters is used instead of sound transmitter 12, for transmitting sound signals in these different frequency bands respectively. Similarly, a plurality of receivers is used instead of each sound receiver 14, for receiving sound signals in these different frequency bands respectively.

In principle, scattering occurs due to scattering sources like air bubbles and particles that may present at any depth in the mud layer and the underlying layer or at their interfaces. Except at the mud-sand interface, the energy of the scattered fraction is much smaller than the transmitted fraction. The measured backscatter mainly depends on the attenuation of the sound as it travels through the layers. The absorption factor per wavelength travel distance is substantially frequency independent, so that the absorption coefficient (amplitude reduction factor per unit length) is inversely proportional to the wavelength of the sound. At 400 kHz, 100 kHz and 10 kHz, the wavelength in water and mud is about 3.7, 15 and 150 mm respectively. At an angle of incidence of thirty degrees with the normal, this results in attenuation coefficients of 200 dB, 50 db, and 6 dB per meter. The scattered fraction near the water mud interface is about −40 dB. This means that there is a mud layer thickness range for which the backscatter in the first and second frequency range are predominantly due to the bottom and top of the under water mud layer.

In the case of a under water mud layer, the detected low frequency back scatter is due to scattering at or near the interface at the underside of the mud layer or, if another layer with higher mass density than under water mud is present under the mud layer, due to scattering at or near the interface with that layer. The detected high frequency signal is due to scattering at water-under water mud interface. The high frequency sound is scattered by scattering sources like air bubbles and particles that may present at any depth in the under water mud layer, but due to strong absorption of the high frequency sound in the under water mud layer mainly the sound scattered at or near the water-under water mud interface is received.

As a result measured back scatter of sound waves with frequency above 100 kHz is mainly due to scatter near the water-under water mud interface and backscatter measurements of sound waves with frequency below 10 kHz are not so limited, but mainly due to backscatter at the mud-sand interface.

Both at the under water mud-sand interface and water-under water mud interface there is a spatially random distribution of scattering sources, which results in fluctuations in the backscattered signal. The phase relation between the incoming sound and scattered sound is substantially the same for all scattering sources, which means that the scattering from different scattering sources does not add up coherently, except in isolated directions where the scatter angle equals the angle of incidence. The statistical average of the backscatter signal from a spatially random distribution of scattering sources would be zero, as it would be in the limit of a near continuous distribution of scattering sources from areas with a diameter of a wavelength. But it has been found that the distribution of scattering sources at the surface of a under water mud layer (e.g. a mud layer) and an underlying sand layer exhibit sufficient spatial fluctuations to produce detectable backscatter.

Processing circuit 18 is configured to make use of a combination of imaging in the horizontal plane and interferometric measurement to measure the depths of the interfaces in the vertical direction. The application of a combination of synthetic aperture technique for resolving scatter positions in the direction of movement of a platform and the interferometric measurement technique to under water acoustic signals is known per se, for example from an article titled "Bathymetric Capabilities of the HISAS Interferometric Synthetic Aperture Sonar" by Saebo et al, published in Proceedings of OCEANS 2007, DOI: 10.1109/OCEANS.2007.4449357.

The interferometric measurement technique makes use of the assumption that the scattering from individual directions from a receiver come only from a single scattering surface. The interferometric measurement technique involves reception of backscattered sound by at least two receivers at different positions.

The basic principle of interferometric measurements of the depth of the water floor relies on the depth dependence of the sound travel times to receivers at different depths. Taking the depth of the scattering surface H(x) as a function of horizontal distance x, and using a receivers at depth z, the delay T(x,z) between transmission phase and detection of the scattering from distance x in a plane perpendicular to the y-direction is $$T(x, z) = D(x) + sqrt(x^2 + (H(x) - z)^2)/c$$

Herein D(x) is the travel time from the transmitter to the horizontal distance x and c is the speed of sound in water. The inverse of this function X(t, z) defines the x-position of the point of the surface from which backscatter is received at time t, with the x position of the receiver as origin. Different delays from the same scatter position result for reception at different z values (and optionally different origins of the x-coordinate). When receivers at depths=z1, z2 are used, a time mapping M(t1, z1, z2) can be constructed $$M(t1, z1, z2) = T(X(t1, z1), z2)$$

Herein t1 and M(t1, z1, z2)=t2 are time points at which receivers at depths z1 and z2 receive signals from the same point on the surface. When the difference dz=z2−z1 between the depths z1 and z2 and the difference dx between the x positions of the receivers is small compared to the difference H(x)−z1 between the depth of the interface and the depth of the first receiver the horizontal distance x, the mapping may be approximated using the derivative of M with respect to z2, multiplied by dz $$M = t1 + (dz*(H(x)-z1)+dx*x)/(sqrt(x^2+(H(x)-z)^2)*c)$$

Thus, the time offset M−t1 between the reception of the same part of the signal can be used to determine the depth difference (H(x)−z1) given the depth difference dz between the receivers and the delay (the square root term) at one of the receivers.

When dx is not zero a horizontal distance dependent correction is also needed. When the horizontal distance x is much larger than the variations of the depth H(x), the horizontal distance can be obtained from the time delay between transmission and reception to one receiver, optionally with a correction using an estimate of the average of the surface depth H(x). If that approximation is too inaccurate, both (H(x)−z1) and x can be solved from a combination of the time delay between transmission and reception at the receivers.

In the case of scattering from discrete reflectors the time offset M−t1 between the reception the same part of the signal can be determined from corresponding echoes. In principle, if a narrow pulse is transmitted and a discrete object scatters that pulse, each of the receivers will receive a scattered narrow pulse as echo and the time offset between these pulses can be used to estimate M−t1. When there are more individual objects, it may be possible to identify pulses from the same object. For other types of signal, e.g. for signals wherein pulses cannot be identified, time offsets can be determined at which the correlation between the signals received with receivers at different depth is maximal, which is used as an indication that the signals have temporal parts with matching time dependences. For this, the correlation may be determined for temporal parts of the signals, e.g. within time intervals of the signals that are offset by the time offset.

By using higher and lower frequencies and determining the time offsets at least for the lower frequencies, measurements of the depths of the under water mud water interface and the under water mud-sand interface are obtained as a function of two dimensional position on the water floor, using the high and low frequencies respectively. Subsequently, the differences between the depths for corresponding positions are used to compute the height of the under water mud layer at these positions. From this the under water mud volume on an area of the water floor can be computed by integrating the computed depths in the area.

FIG. 3 shows a flow-chart of operation of a simple embodiment of the under water mud layer thickness measuring system. Measurements are performed while platform 20 is moved through the water. The direction of movement will be referred to as the y-direction. Processing circuit 18 is configured to perform a first step 31, wherein processing circuit 18 controls signal generator 10 to generate a pulse containing oscillations in a first frequency range e.g. above 150 kHz.

Signal generator 10 supplies the generated signal to sound transmitter 12, which converts the signal to a sound pulse or frequency sweep in the body of water 22. The sound pulse or frequency sweep travels through the body of water 22 and scatters from water floor 24, mainly from the water-under water mud layer interface at the top of the under water mud layer. The scattered sound travels in various directions, including back to array of sound receivers 14, which converts the backscattered sound to a plurality of at least two different signals, registered at different heights. Sound receivers 14 supply these signals to array of detectors 16. The detectors in array of detectors 16 are configured to sample the registered signals S(t, i, y) from different receivers 14 labeled by "i" as a function of time "t" after transmission of the pulse, each signal at a different position y along its track of movement of platform 20.

Processing circuit 18 is configured to perform a second step 32, wherein processing circuit 18 reads detected signals from array of detectors 16 and stores the detected signals. Processing circuit 18 is configured to perform a third step 33 and a fourth step 34, performing similar actions as first step 31 and second step 32, with a frequency in a second frequency range e.g. below 10 kHz. In this frequency range the wave scatters mainly from the under water mud layer— sand interface at the bottom of the under water mud layer. Third step 33 and a fourth step 34 may be performed in parallel with first step 31 and second step 32. When different transmitters and/or receivers are used for the different frequency ranges, first step 31 and second step 32 may be performed using one or more first transmitters and one or more first receivers. Third step 33 and fourth step 34 may be performed using one or more second, different transmitters and one or more second, different receivers. When the same transmitter and first receivers are used for both frequency ranges, the generated signals in the different frequency ranges may be added.

In a fifth step 35 processing circuit 18 tests whether floating platform has reached the end of the track on the surface of the body of water 22 along which the measurements have to be performed, (or the end of a section of the track). If not, processing circuit 18 returns to first step 31. By means of multiple repetitions measurements at both predetermined frequencies or sweep ranges while floating platform 20 moves along the track measurements along the track are collected.

For each y value, the signal S(t, i, y) at a given time t depends on scatter from the scattering sources over a range of y positions from all of which the scattered pulse arrive at the same time. After the end of the track or the section of the track has been reached, processing circuit 18 performs a sixth step 36, to resolve the scatter sources in the y-direction parallel to the track. Any of a number of conventional techniques may be used to resolve the scatter sources in this direction. For example, when a pulsed sound transmission is used, so that there is a relation between time and distance, this can be realized by summing signal S(t'(y), i, y') from the receiver i obtained at different positions along the track with different delays t'(y) selected to correspond to the travel times of backscatter with the receiver at position y along the track to a distance from the track that corresponds to the time t when y=y' (for example $t'=2*sqrt(((y-y')/c)^2+t^2)$, if it would be assumed that the transmitter and the receiver are at the same position). In an embodiment, sixth step 36 may comprise the application of corrections, such as use of measurements of the actual track and correction for swerving from a straight line track, and/or for displacement of the receiver between transmission and reception.

Alternative techniques to resolve the scatter sources in this direction may include using an array of receivers attached to the platform at different positions in the y direction and summing the signals from the different receivers with relative delays according to the scatter position for which the signals are summed, and the y-positions of the different receivers. The resulting signals will also be referred to as synthetic signals, since they are formed by summing.

As an other alternative to resolve scatter sources an array of transmitters may attached to the platform at different positions in the y direction may used, which are excited with relative delays according to a scatter position to which sound is to be directed. As a further alternative a combination of an array of transmitters and an array of transceivers may be used.

Moreover, although an embodiment using pulses has been described, it should be realized that instead of short pulses, more extended signals may be used to determine signal as a function of travel time, e.g. by spreading the spectrum. For example a linear frequency sweep transmission may be used, combined with a filter on the reception side to resolve different travel times. First and second spread spectra in the first and second frequency range may be used.

If need be, measurements of the position and/or orientation of the platform may be used to compute the delays for use in the computation of the synthetic signal and/or for geographical mapping of the measurement. The system may comprise sensors, such as one or more GPS sensors, orientation sensors, beacon signal transmitters and/or receivers etc attached to the platform to obtain such measurements. Optionally, beacons fixed to the water floor may be used.

Processing circuit 18 computes synthetic signals $S1(t, i, y)$ for the first and for the second frequency and for a receivers at a first and second depths first and separately. Subsequently, processing circuit 18 performs a seventh step 37 using the synthetic signals $S1(t, i, y)$ wherein processing circuit 18 uses the interferometric measurement technique for each frequency or frequency range to determine the depth $H(x,y)$ from the synthetic signals $S1(t, i, y)$ from the different receivers 14 labeled by i. In an embodiment, this comprises the computation of a time mapping function $t2=M(t1,y)$ of the time dependence of the signals $S1(t, i, y)$ for the different receivers (denoted by different i) and the computation of $H(x,y)$ from this mapping.

The time mapping function may be determined by identifying matching temporal parts of the signals from $S1(t, i, y)$ from receivers "i" at different depths, e.g. by identifying pulses or determining time offsets at which the correlation between the signals received with receivers at different depth is maximal. Correlations may be determined for temporal parts of the signal, e.g. the signals within time windows.

Processing circuit 18 may be configured to estimate shift values $dx(x, y)$ from correlations between the signals $S1(x, 1, y)$ and $S1(x, 2, y)$ (wherein i=1 and i=2 denote the different receivers). For each of a plurality of horizontal distances x, processing circuit 18 choses a value of $dx(x, y)$ that yields a maximal correlation between $S1(x, 1, y)$ and $S1(x+dx(x, y), 2, y)$ as a function of dx.

In an embodiment, processing circuit 18 may be configured to determine the mapping function by first using an initial mapping of the time dependence of the signals $S1(t, i, y)$ to horizontals distance x, using a mapping $x=M0(t,z,h)$, for an estimated average depth h of the scattering interface, dependent on the depth z of the receiver. This ensures that the initially mapped signals $S1'(x, i, y)$ with $S1'(M0(t, zi, h), i, y)=S1(t, i, y)$ map the signals from corresponding backscatter sources approximately to corresponding horizontal distances, with differences due to deviations from the estimated average depth h.

In this embodiment, processing circuit 18 may be configured to estimate shift values $dx(x, y)$ from correlations between the initially mapped signals $S1'(x, 1, y)$ and $S1'(x, 2, y)$ (wherein i=1 and i=2 denote the different receivers). For each of a plurality of horizontal distances x, processing circuit 18 chooses a value of $dx(x,y)$ that yields a maximal correlation between $S1'(x, 1, y)$ and $S1'(x+dx(x,y), 2, y)$. Processing circuit 18 may be configured to perform a search for this $dx(x,y)$ in a predetermined limited range of dx values, because the initially mapped signals already map the signals from corresponding backscatter sources approximately to corresponding horizontal distances x. Under the assumption that x and x+dx in the signals from the different receiver map to the same scattering point on the actual scattering surface, the actual depth $H(x,y)$ is determined from dx. It has been found that in the selected frequency first and second ranges this can provides reasonably accurate measurements of the height of the bottom and the top of the under water mud layer respectively.

Processing circuit 18 performs such determinations of the depth $H(x,y)$ for the signals obtained in each of the first and second frequency ranges in seventh step 37. Subsequently, processing circuit 18 performs an eight step 38, wherein processing circuit 18 estimates the thickness of the under water mud layer from the difference between the depths determined from using the different frequencies.

In an embodiment, processing circuit 18 may be configured to perform one of more forms of further processing using the measured thickness. For example processing circuit 18 may be configured to compute and a display a two dimensional map of the thickness, different thicknesses being represented e.g. as different colors or gray values. As another example processing circuit 18 may be configured to compute a volume of the under water mud layer in a selected area on the water floor by integrating (e.g. summing) the estimated thickness values in the area.

Although a description of a simple embodiment has been presented, it should be noted that this is merely a simple example. Although an embodiment has been described wherein the transmitter and the receivers are substantially co-located on the same floating platform 20, it should be noted that the transmitter may be located at any distance from the receivers. As long as the positions of the transmitter relative to the receivers are known, accordingly adapted expressions for the relation between the horizontal distance, the depth and the reception delay time the depths can be used to perform similar measurements as described in the preceding. If need be the positions of the transmitter and the receivers or their relative positions may be measured for use in such a computation. A plurality of transmitters may be used to transmit similar signals with relative time offsets to synthesize a beam of sound in a selected range of directions.

Although measurements of signals from receivers at only two different heights may suffice, instead an array of receivers at more heights may be used. In one embodiment, such an array of receivers can be used as a pair of sub-arrays and for each sub-array a synthesis of the received signals may be used to realize a higher reception direction sensitivity. In this embodiment, signals from the different within each sub-array may be combined at an early stage with relative delays selected to realize the desired direction of maximum sensitivity, to form the signals S before the synthetic signal S1 are computed. In an embodiment, different relative delays may be used for different horizontal distances, to realize different directions of maximum sensitivity according to the horizontal distances and the average depth.

Alternatively the signals from each receiver may be used to compute a synthetic signal S1 for the receiver, which may be combined for use in the interferometric measurement technique. Alternatively, the interferometric measurement technique may be applied to more than one pair of receivers by applying the interferometric measurement technique to each pair and computing the surface depth from a combination of such determinations (e.g. an average) or by fitting the depth to the mappings for the pair.

Although an example of computing a synthetic signal S1 has been given that used a pulse signal, it should be realized that various types of signal may be used. The pulse may be obtained simply by modulation a continuous oscillating signal at the selected first and second frequency with a pulse shaped envelop. In another example a pulse may be obtained by pulse amplitude modulation a continuous oscillating signal with a swept frequency. Similarly a longer lasting signal with a swept frequency may be used. Known techniques, such as for FMCW modulation may be used to convert the scattered signals to distance dependent back scatter intensity.

Although a simple example has been given for the computation of the synthetic signals S1, it should be appreciated that many variations of determining synthetic signals for different y values are possible that are well known per se. Different weights may be given to signals from different y–y' distances, or the y–y' range that is used may be limited. Instead of using the time dependent signals directly, Fourier transform techniques may be used. Relative delays may be applied by summing signals multiplied by complex coefficients with different phase.

Although a simple example has been given of the implementation of the interferometric measurement technique, it should be appreciated that many variations are possible that are well known per se. For example, noise in the depths may be reduced by smoothing the measurements obtained for different y values as a function of the y direction. For example a depth function H(x,y) that minimizes differences between the measured signals and predicted signal may be determined.

Although an embodiment has been described wherein the time shift between reception of matching signal parts is used it should be appreciated that it may suffice to use techniques that determine such a time shift implicitly, such as direction of arrival detection techniques, used to determine the direction of arrival of scattered sound from a scattering position, using receivers at different depth. As used herein determining time shift and computing a depth from a time shift, covers determining any other quantity and computing the depth from such other quantities that can be translated into the time shift, even if the time shift is not determined explicitly. The same goes for techniques that determine the time dependence of the time shift implicitly, e.g. in terms of a Fourier transform.

Although an embodiment has been described wherein only two receivers are used to compute the depth, it should be noted that more receivers can be used. For example a depth may be computed that best fits the time shifts of matching parts of the signals received by a plurality of receivers, or an average of depths computed from different pairs may be used. The effect of statistical outliers may be suppressed.

Although an embodiment has been described wherein the time shift between reception of matching signal parts at two receivers are used to compute the depth of the top surface of the under water mud layer, it should be noted that other ways of obtaining the depth of the top surface may be used that are known per se, e.g. using multi-beam systems, like a multi-beam echo sounder. As an example, the depth may be measured by scanning a directed transmission beam and measuring the time delay of the scattered signal as a function of scan direction and/or by scanning directional sensitivity of reception. A transmitter array and/or receiver array may be used for this purpose. For sufficiently high sound frequencies sufficiently directive transmission and/or reception patterns can be realized. But in the lower frequency band getting a sufficiently directive pattern is not practical.

The invention claimed is:

1. A method of determining a position dependent depth of a top and bottom of an underwater mud layer by use of acoustical scattering underwater measurements, the method comprising:
   transmitting sound in a sidelooking configuration from a transmitter in a body of water above the underwater mud layer, the transmitting comprising transmitting:
      sound in a higher frequency range above 100 kHz, and
      sound in a lower frequency range below 20 kHz;
   detecting a received higher frequency signal due to scattering of the sound in the higher frequency range from scatter positions along a selected horizontal direction, as a function of time from the transmitting sound, wherein the sound in the higher frequency range is selected such that measured backscatter is mainly due to scattering at or near the water/mud interface;
   computing a first depth, of a top surface of the underwater mud layer, as a function of the scatter positions along the selected horizontal direction, using the received higher frequency signal;
   detecting a plurality of lower frequency signals received by an array of receivers arranged at respective different heights in the body of water, due to scattering of the sound in the lower frequency range from scatter positions along the selected horizontal direction, as a function of time from the transmitting, wherein the sound in the lower frequency range is selected such that measured backscatter is mainly due to scattering at or near the mud/sand interface;
   determining time shifts between the plurality of lower frequency signals received at the respective different height from the same scatter positions on the bottom surface of the underwater mud layer; and
   computing a second depth of a bottom surface of the underwater mud layer based on the time shifts.

2. The method according to claim 1, comprising computing a difference between the first depth and the second of the underwater mud layer at corresponding positions.

3. The method according to claim 1, comprising:
   detecting at least one further higher frequency signal due to the scattering of the sound in the higher frequency range from scatter positions along the selected horizontal direction, the received higher frequency signal and the at least one further received higher frequency signal being received at mutually different heights; and
   determining a further time shift as a function of time between temporal parts of the received higher frequency signal and the at least one further received higher frequency signal that have matching time dependences in the received higher frequency signal and the at least one further received higher frequency signal,
   wherein the computing of the first depth being based on the further time shifts.

4. The method according to claim 1, comprising synthesizing the received lower frequency signal for the selected horizontal direction from respective lower frequency signals received at different positions along a further horizontal direction, transverse to the selected horizontal direction.

5. The method according to claim 4, comprising moving receivers, used to receive the received lower frequency signals, along the further horizontal direction and receiving the respective lower frequency signals received at different positions during the moving.

6. The method according to claim 4, comprising moving receivers, used to receive the received lower frequency signals, along a further horizontal direction and computing the first depth and the second depth along the further horizontal direction from a series of positions along the further horizontal direction.

7. The method according to claim 1, wherein the first depth and the second depth are computed using the received higher frequency signal and the plurality of received lower frequency signals for the time from the transmitting in a time window that includes scattering of sound waves from distances from positions of transmission at which the direction of propagation of the sound waves is at least sixty degrees to the vertical direction.

8. A water depth measuring system, comprising:
a sound transmitter, or a plurality of sound transmitters, configured to transmit sound in a sidelooking configuration in a body of water, the transmitting comprising transmitting:
sound in a higher frequency range above 100 kHz, and sound in a lower frequency range below 20 kHz;
a first sound receiver, configured to receive a received higher frequency signal due to scattering of the sound in the higher frequency range as a function of time from the transmitting, wherein the sound in the higher frequency range is selected such that measured backscatter is mainly due to scattering at or near the water/mud interface;
a plurality of sound receivers configured to detect a plurality of lower frequency signals received by an array of receivers arranged at respective different heights in the body of water, due to scattering of the sound in the lower frequency range from scatter positions along the selected horizontal direction, as a function of time from the transmitting, wherein the sound in the lower frequency range is selected such that measured backscatter is mainly due to scattering at or near the mud/sand interface, and wherein the plurality of sound receivers comprises the first sound receiver and a second sound receiver, or a third sound receiver and the second sound receiver, each of the plurality of sound receivers being located at a respective different height;
a processing circuit, configured to:
compute a first depth, of a top surface of the underwater mud layer, as a function of scatter positions along a selected horizontal direction, using the received higher frequency signal;
determine time shifts between the plurality of lower frequency signals received at the respective different height from the same scatter positions on the bottom surface of the underwater mud layer; and
compute a second depth of a bottom surface of the underwater mud layer based on the time shifts.

9. The water depth measuring system according to claim 8, wherein the processing circuit is configured to compute a difference between the depths of the top surface and the bottom surface of the underwater mud layer at corresponding positions.

10. The water depth measuring system according to claim 8, wherein the processing circuit is configured to determine a further time shift as a function of time between temporal parts of the received higher frequency signal and at least one further received higher frequency signal received with the second receiver or a further receiver at a different height compared to the first receiver, wherein the temporal parts have matching time dependences in the received higher frequency signal and the at least one further received higher frequency signal; and
wherein the processing circuit is configured to compute the first depth based on the further time shifts.

11. The water depth measuring system according to claim 8, wherein the processing circuit is configured to synthesize the received lower frequency signal for the selected horizontal direction from respective lower frequency signals received at different positions along a further horizontal direction, transverse to the selected horizontal direction.

12. The water depth measuring system according to claim 8, wherein the processing circuit is configured to compute the first depth and the second depth using the received higher frequency signal and the plurality of received lower frequency signals for the time from the transmitting in a time window that includes scattering of sound waves from distances from positions of transmission at which the direction of propagation of the sound waves is at least sixty degrees to the vertical direction.

* * * * *